US006805888B2

(12) United States Patent
Wu

(10) Patent No.: US 6,805,888 B2
(45) Date of Patent: Oct. 19, 2004

(54) METHOD FOR PREPARING A PUFFED GRAIN FOOD PRODUCT AND A PUFFED GRAIN FOOD PRODUCT

(75) Inventor: Rei-Young Amos Wu, Palatine, IL (US)

(73) Assignee: The Quaker Oats Company, Chicago, IL (US)

(*) Notice: Subject to any disclaimer, the term of this patent is extended or adjusted under 35 U.S.C. 154(b) by 260 days.

(21) Appl. No.: 09/888,170

(22) Filed: Jun. 22, 2001

(65) Prior Publication Data

US 2002/0197383 A1 Dec. 26, 2002

(51) Int. Cl.$^7$ ................................................ A23L 1/18
(52) U.S. Cl. ...................... 426/93; 426/274; 426/445; 426/460; 426/507; 426/621; 426/625
(58) Field of Search ........................... 426/93, 274, 445, 426/460, 507, 621, 625

(56) References Cited

U.S. PATENT DOCUMENTS

| | | | |
|---|---|---|---|
| 2,120,138 A | 6/1938 | Mathews et al. | |
| 2,162,376 A | 6/1939 | Collatz | |
| 2,701,200 A | 2/1955 | Huber | |
| 2,785,070 A | 3/1957 | Kester et al. | 99/81 |
| 2,954,295 A | 9/1960 | Clausi et al. | |
| 2,954,296 A | 9/1960 | Clausi et al. | |
| 3,505,076 A | 4/1970 | Maloney et al. | 99/81 |
| 3,556,802 A | 1/1971 | Gulstad et al. | 99/80 |
| 3,580,727 A | 5/1971 | Gulstad et al. | 99/81 |
| 3,580,728 A | 5/1971 | Gulstad et al. | 99/81 |
| 3,637,400 A | 1/1972 | Mullen et al. | |
| 3,650,763 A | 3/1972 | Touba | 99/82 |
| 3,708,308 A | 1/1973 | Bedenk et al. | |
| 3,753,728 A | 8/1973 | Bedenk et al. | |
| 3,988,484 A | 10/1976 | Shatila | |
| 4,073,958 A | 2/1978 | Abe | |
| 4,281,593 A | 8/1981 | Gevaert | |
| 4,310,560 A | 1/1982 | Doster et al. | |
| 4,328,741 A | 5/1982 | Yoshikazu | |
| 4,508,736 A | 4/1985 | Bean et al. | |
| 4,623,546 A | 11/1986 | Holay et al. | |
| 4,667,588 A | 5/1987 | Hayashi | |
| 4,734,289 A | 3/1988 | Yamaguchi et al. | |
| 4,764,390 A | 8/1988 | Zukerman et al. | |
| 4,876,099 A | 10/1989 | MacGregor et al. | 426/242 |
| 4,888,180 A | 12/1989 | Wu | 426/618 |
| 4,931,303 A | 6/1990 | Holm et al. | |
| 4,965,081 A | 10/1990 | Lazarus | 426/242 |
| 5,073,281 A | 12/1991 | Paules et al. | |
| 5,102,677 A | 4/1992 | Van Den Berghe | |
| 5,137,745 A | 8/1992 | Zukerman et al. | |
| 5,258,189 A | 11/1993 | Efstathiou | 426/73 |
| 5,356,642 A | 10/1994 | Patterson et al. | |
| 5,368,870 A | 11/1994 | Efstathiou | 426/73 |
| 5,376,395 A | 12/1994 | Pels | |
| 5,481,962 A | 1/1996 | Tedesco | |
| 5,554,405 A | 9/1996 | Fazzolare et al. | |
| 5,562,021 A | 10/1996 | Slanik | |
| 5,614,239 A | 3/1997 | Tedesco | |
| 5,755,152 A | 5/1998 | Menzin | |
| 5,817,355 A | 10/1998 | Zukerman et al. | 426/272 |
| 5,846,584 A | 12/1998 | Capodieci | |
| 5,871,793 A | 2/1999 | Capodieci | 426/238 |
| 6,022,137 A | 2/2000 | White et al. | |
| 6,068,868 A | 5/2000 | Capodieci | 426/238 |
| 6,083,552 A | 7/2000 | Kershman et al. | |
| 6,143,336 A | 11/2000 | Capodieci | |
| 6,171,631 B1 | 1/2001 | Willoughby et al. | |
| 6,248,379 B1 | 6/2001 | Capodieci et al. | |
| 6,517,879 B2 * | 2/2003 | Capodieci | 426/238 |

FOREIGN PATENT DOCUMENTS

| | | |
|---|---|---|
| BE | 799.316 | 11/1973 |
| BE | 886.895 | 4/1981 |
| BE | 893.770 | 11/1982 |
| BE | 902.360 | 9/1985 |
| BE | 904.631 | 8/1986 |
| BE | 906.029 | 6/1987 |
| BE | 1000927 A6 | 5/1989 |
| EP | 0-344-867 B1 | 12/1989 |
| EP | 0-367-031 | 5/1990 |
| EP | 1008307 * | 6/2000 |
| GB | 2165437 A | 10/1985 |
| JP | B-176375 | 8/1947 |
| JP | 26 (1950)-2022 | 3/1950 |
| JP | 26 (1951)-296 | 1/1951 |
| JP | 26 (1951)-1096 | 2/1951 |
| JP | 26 (1951)-5287 | 5/1951 |
| JP | 62 (1987)-19121 | 4/1987 |
| JP | 62 (1987)-179346 | 8/1987 |
| JP | 63 (1988)-116647 | 5/1988 |
| JP | 63 (1988)-222653 | 9/1988 |
| WO | WO 88/00797 | 2/1988 |
| WO | WO 88/06425 | 9/1988 |
| WO | WO 89/06092 | 7/1989 |
| WO | WO 90/08477 | 8/1990 |
| WO | WO 92/08375 | 5/1992 |
| WO | WO 92/12646 | 8/1992 |
| WO | WO 01/62106 | 8/2001 |

OTHER PUBLICATIONS

Juliano, Beinvenido O., Properties of the Rice Caryopsis, Rice: Production and Utilization, pp. 403–437.
Kennedy, Barabra M., Nutritional Quality of Rice Endosperm, Rice: Production and Utilization, pp. 439–447.
Li, Chin–Fung et al., Rice Snack Foods, Rice: Production and Utiization, pp. 690–711.

(List continued on next page.)

Primary Examiner—Carolyn Paden
(74) Attorney, Agent, or Firm—Lars S. Johnson; James D. Ryndak

(57) ABSTRACT

The present invention relates to a method for preparing a puffed grain food product having a mixture of puffable low expansion grain and puffable high expansion grain. Flavoring agents, coloring agents or mixtures thereof are absorbed into the puffable low expansion grain pieces. The treated puffable low expansion grain pieces are then mixed with the puffable high expansion grain pieces, placed in a mold, and puffed to form an edible puffed grain food product.

20 Claims, 1 Drawing Sheet

OTHER PUBLICATIONS

Luh, Bor S. et al., Parboiled Rice, Rice: Production and Utilization, pp. 501–542.
Luh, Bor S. et al., Quick Cooking Rice, Rice: Production and Utilization, pp. 566–589.
Luh, Bor S. et al., Breakfast Rice Cereals and Baby Foods, Rice: Production and Utilization, pp. 622–649.
Rice: Production and Utilization, Table of Contents.
Hsieh, F. et al., Putting of Rice Cakes as Influenced by Termpering and Heating Conditions.
Curriculum Vitae of Willy DePauw.
Declaration of Willy Depauw dated Jun. 6, 2002.
Declaration of Rene van den Berghe dated Oct. 1, 2001.
Three (3) sheets of photocopies of product manufactured by Hunt–Wesson, Inc. of Fullerton, CA, and called "Orville Redenbacker's 100% Popcorn Mini Cakes—Caramel Flavor."
Incomec Cerex Grain Processor Operations Manual dated Nov. 13, 1997.
Juliano, Bienenido O., Miscellaneous Products, Rice and Chemistry and Technology, pp. 604–606.

* cited by examiner

METHOD FOR PREPARING A PUFFED GRAIN FOOD PRODUCT AND A PUFFED GRAIN FOOD PRODUCT

FIELD OF THE INVENTION

The present invention relates to: a method for preparing a puffed grain food product by mixing a puffable low expansion grain with a puffable high expansion grain; and a puffed grain food product. The puffable low expansion grain has a flavoring agent, a coloring agent or combination thereof absorbed therein. The grain mixture is placed in a mold wherein the mixture is puffed to produce a puffed grain food product.

BACKGROUND OF THE INVENTION

Grain cake products and methods for producing them are well known in the art. Examples of such grain cake products include rice cakes, corn cakes and popcorn cakes. These grain cake products are typically formed by expanding a mixture of puffable or expandable edible ingredients in an enclosed chamber thereby forming the edible ingredients into a shape that corresponds to the shape of the cavity formed by the chamber. The mixture of edible ingredients is typically expanded by being heated under pressure, followed by rapid pressure release.

In a typical process commonly known as grain puffing, a pre-measured quantity of grain is fed onto the top of a heated piston. The piston and edible ingredients are then advanced by a hydraulic cylinder into a heated female mold to create a small, hermetically sealed chamber enclosing the cereal grains. Heat and superatmospheric pressure in the chamber is suddenly released by rapidly retracting the hydraulic cylinder. The suddenly depressurized chamber is not, however, sufficiently opened to release the edible ingredients. Rather, the hydraulic cylinder is retained in a substantially closed but vented position. As the pressure is released, the edible ingredients expand to substantially fill the chamber, and while still in a plastic state, the individual grains bond together to form a grain cake or wafer. The hydraulic piston is then fully retracted to open the chamber, and the formed cake is mechanically ejected. The heating also acts to cook the edible ingredients. Puffing technology is disclosed in U.S. Pat. No. 4,888,180 to Wu.

One issue concerning such grain cake products is their appearance. Grain cake products often have an unremarkable appearance, usually due to the fact that they are prepared from grains. One way to improve the appearance of grain cake products is to color them, for example, by applying a color coating to their surface.

An additional concern regarding puffed grain cake products is that they have little or no flavor. Flavored versions of grain food products or cakes have been introduced into the marketplace to address this concern. Examples of such flavored grain cakes include butter flavored, caramel flavored, cheese flavored, peanut butter flavored and chocolate flavored grain cakes. Flavor and/or coloring for these products is applied as a coating to the exterior or outer surface of the already-formed puffed grain product. A need exists for a puffed grain cake product having flavor and/or color distributed within and/or throughout the entire mass or volume of the puffed grain product or cake.

The high degree of expansion exhibited by the grains currently used in the puffing process adversely affects these grains' ability to absorb liquid flavor or color coatings. When current high expansion grains are coated with flavor or coating compositions and subsequently exposed to the heat, pressure and rapid expansion conditions of the puffing process, most, if not all, of the coating composition is expelled from the individual grain pieces.

An added complication arises when these flavor and/or color coating compositions contain heat sensitive edible ingredients. Upon expulsion from the high expansion grains during the grain cake formation process, these coatings impart burnt flavors and off odors to the final grain cake food product. Expelled coloring and flavoring compositions also create production problems as the expelled coating compositions consolidate upon production machinery. This increases production downtime as the production machinery requires more frequent cleaning.

Utilizing grains with higher absorption characteristics is not a viable solution. These grains typically demonstrate poor taste, texture and mouthfeel properties after puffing and formation into a grain cake. Such traits make high absorption grain cakes unappealing to consumers. A need therefore exists for a method of preparing a puffed grain food product, and the resulting product, having flavoring and/or coloring incorporated within and/or throughout the mass or body of the puffed grain product or cake.

SUMMARY OF THE INVENTION

The present invention provides a method of making a puffed grain food product having the desired flavoring or color distributed throughout the mass or body of the puffed grain product. The method comprises the steps of mixing puffable or expandable relatively high expansion grain pieces with puffable or expandable relatively low expansion grain pieces or grain-based material. Absorbed into the puffable low expansion grain pieces is a desired additive, such as a flavoring agent, a coloring agent, or a mixture thereof. The mixture of grain pieces is placed in a mold and puffed to form an edible puffed grain food product. The resulting product made by this method results in a puffed grain product or cake that has the flavoring and/or coloring agent distributed within and/or throughout the mass of the resulting product.

In accordance with another aspect of the present invention, the puffable low expansion grains are treated with a liquid absorption composition containing the flavoring agent, the coloring agent or mixtures thereof.

As used herein, the term "puffable" means that the food product to be puffed can be expanded in a puffing machine.

In accordance with another aspect of the present invention, the relatively low expansion grain exhibits an expansion ratio lower than the high expansion grain and typically in the range of about 1:1 to about 1:7 and the relatively high expansion grain exhibits a greater expansion ratio, typically in the range of about 1:7 to about 1:30.

In accordance with another embodiment of the present invention, the puffable low expansion grain pieces are pre-processed to increase their absorption capacity before contacting the absorption composition. This pre-process treatment can be selected from extruding, popping, microwaving, roasting, steaming, baking, steeping, extracting, pelleting, freeze drying, drum drying, spray drying, micronizing and combinations thereof.

In accordance with another embodiment of the present invention, the puffable low expansion grains exhibit an absorption capacity in the range of about 50% to about 150% by weight of the unabsorbed low expansion grain.

In accordance with another embodiment of the present invention, the flavoring agent is selected from the group consisting of chocolate, butterscotch, any spice flavor, vanilla, any fruit flavor, caramel, nut flavors, beef, poultry, pork or seafood flavors; dairy flavors such as butter and cheese; any vegetable flavor and combinations thereof.

In accordance with another embodiment of the present invention, the coloring agent is as desired and may be of botanical, animal, mineral or synthetic nature, for example, FD&C Blue No. 1, FD&C Blue No.2, FD&C Green No.3, FD&C Red No.3, FD&C Red No.40, FD&C Yellow No.5, FD&C Yellow No.6, Orange B, Citrus Red No.2, annatto extract, b-apo-8'-carotenal, beta-carotene, beet powder, canthaxanthin, caramel color, carrot oil, cochineal extract, cottonseed flour, ferrous gluconate, fruit juice, grape color extract, paprika, riboflavin, saffron, titanium dioxide, turmeric, vegetable juice and combinations thereof.

In accordance with another aspect of the present invention, the puffable grain mixture may comprise between 5% to 25% by weight puffable low expansion grain.

In accordance with another aspect of the invention, the puffed grain food product is in the shape of a cake.

In accordance with still another aspect of the present invention, a puffed grain food product is provided that is prepared by a method comprising the steps of mixing puffable relatively high expansion grain pieces with puffable relatively low expansion grain pieces. Absorbed into the puffable low expansion grain pieces is a desired additive, such as a flavoring agent, a coloring agent, or a mixture thereof. This mixture is placed in a mold and puffed to form the edible puffed grain food product.

DETAILED DESCRIPTION OF THE INVENTION

Figure 1:
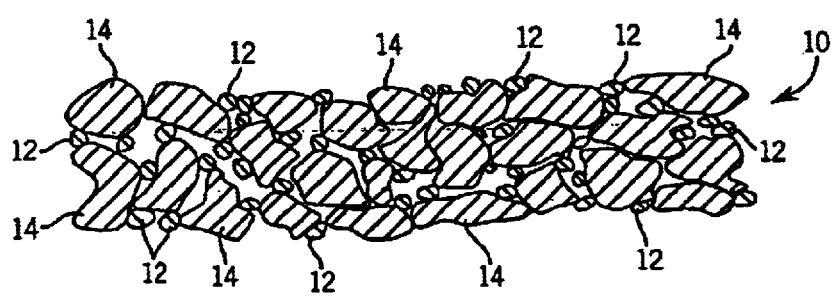
FIG. 1 is a cross-sectional view of a puffed grain cake in accordance with the invention.

The method of the present invention initially provides a puffable high expansion grain as is commonly known to those skilled in the art. As previously discussed, grains expand volumetrically when subjected to the puffing process. This phenomenon is typically described in terms of a grain expansion ratio wherein the volume of the puffable grain is compared to the volume of the same grain after puffing. As such, a high expansion grain is herein defined as a grain that exhibits more expansion (typically at least 25% more) as a result of puffing than the low expansion grain and typically has an expansion ratio in the range of from about 1:7 to greater than 1:30. Preferably the high expansion grains applied to the present invention will have a grain expansion ratio of about 1:7 to about 1:25.

Examples of such high expansion grains include, but are not limited to, uncooked grains such as corn, potato, tapioca, starch extrudates, rice, including uncooked brown and white rice, long grain rice, popcorn, wheat, Durham wheat, barley, buckwheat, millet, rye and mixtures thereof. It is to be understood that minor variances in expansion ratios for individual grain pieces will occur for any given lot of grain subjected to the puffing process.

The present invention subsequently provides a puffable low expansion grain with a flavoring or coloring agent absorbed thereon. A low expansion grain is herein defined as a grain with less expansion during puffing than the high expansion grain and typically has an expansion ratio in the range of about 1:1 to about 1:9. The skilled artisan readily acknowledges that the expansion capacity of a grain is inversely related to the grain's absorption capacity. Absorption capacity is herein defined as the ability of a puffable grain piece to absorb a component when contacted with that component. Absorption capacity is expressed as the following percentage: the volume of the component absorbed divided by the original volume of the absorbant. For example, white rice, a typical absorbant, yields an absorption capacity of about 27% when soaked in water at ambient temperature for 60 minutes.

It has been found, however, that exposing puffable low expansion grains to certain processes prior to contact with an absorption component can increase the absorption capacity of the grain. Such processes include, but are not limited to, extruding, popping, microwaving, roasting, steaming, baking, steeping, extracting, pelleting, freeze drying, drum drying, spray drying, micronizing and combinations thereof. Puffable low expansion grains subjected to such processes typically exhibit absorption capacities from about 20% to about 250%. Examples of puffable low expansion grains or grain-based material demonstrating absorption capacities in this range that can be used in accordance with the invention include, but are not limited to, instantized rice, including instantized parboiled brown rice and instantized parboiled white rice; wafer material, oats, oat flakes and mixtures thereof; crisp rice, crisp wheat and mixtures thereof; corn, wheat, rye, barley, and mixtures thereof; wheat gluten products with instantized rice and instantized parboiled rice. Preferably, the puffable low expansion grain has an absorption capacity in the range of about 50% to about 200%. By "wafer material" is meant a product made with a grain-based batter having an added leavening agent that is baked to form a low density (typically about 0.2 grams per cubic centimeter or less) low moisture product. Typically, the wafer material would be utilized in a size that is similar to the size of the high expansion material.

An absorption composition is subsequently absorbed into the puffable low expansion grain pieces. The absorption composition is selected from the group of ingredients consisting of one or more flavoring agents, one or more coloring agents and mixtures thereof. The absorption composition may or may not be heat sensitive. Furthermore, the absorption composition may be in the form of a solid, a vapor, a fog, a mist, a gel, atomized particles or a liquid. The flavoring agent may include any desired or suitable edible flavoring agent known in the art including, but not limited to, for example, chocolate, butterscotch, peppermint, any flower flavor, any spice flavor, vanilla, any fruit flavor, caramel, nut flavors, beef, poultry, pork or seafood flavors; dairy flavors such as butter and cheese; any vegetable flavor and combinations thereof.

The coloring agent may be any suitable food coloring, additive, dye or lake known to those skilled in the art. Such food colorants may include, but are not limited to, for example, Food, Drug and Cosmetic (FD&C) Blue No. 1, FD&C Blue No.2, FD&C Green No.3, FD&C Red No.3, FD&C Red No.40, FD&C Yellow No.5, FD&C Yellow No.6, Orange B, Citrus Red No.2 and combinations thereof. Other coloring agents may include annatto extract, b-apo-8'-carotenal, beta-carotene, beet powder, canthaxanthin, caramel color, carrot oil, cochineal extract, cottonseed flour, ferrous gluconate, fruit juice, grape color extract, paprika, riboflavin, saffron, titanium dioxide, turmeric, and vegetable juice. These coloring agents may be combined or mixed as is common to those skilled in the art to produce a final coloring agent.

The absorption composition may be comprised of a mixture of flavoring and coloring agents. For example, a strawberry flavoring agent may be combined with FD&C Red No. 3 to enhance the aesthetic appeal of the final grain cake product. Similarly, an edible aromatic agent as known in the art may be added to the absorption composition as desired.

Preferably, the absorption composition is a liquid. The liquid absorption composition may be prepared by any method known in the art. A non-limiting example of a suitable preparation method for the liquid absorption composition is dissolving and mixing or dispersing the flavoring and/or coloring agent at ambient or elevated temperature in water, oil or an edible organic solvent such as an alcohol. Alternatively, the liquid absorption composition may be prepared by simply heating a solid flavoring and/or coloring agent to its respective melting point until the liquid phase of the same is obtained.

The puffable low expansion grains are then contacted with the absorption composition by any method known to those skilled in the art. Such methods may include, but are not limited to, spraying the puffable low expansion grains with the flavorant/colorant composition or immersing the low expansion grain pieces in a liquid form of the composition. Preferably, the low expansion grains are agitated while being treated with the absorption composition. Contact of the puffable low expansion grain with the absorption composition may be at either ambient or elevated temperature.

Preferably, the puffable low expansion grain remains in contact with the absorption composition for a period of time such that the grains obtain a desired absorption, such as an absorption of at least 30% to about 100% by weight of the grain prior to the absorption. For example, this time period may range anywhere between about 10 seconds to 60 minutes depending on the temperature of the absorption composition, the flavoring agent/coloring agent profile of the absorption composition, and the composition of the puffable low expansion grain. Once the desired absorption is achieved, the puffable low expansion grains are subsequently removed from the absorption composition and typically are allowed to dry.

The treated puffable low expansion grain pieces are then combined with the puffable high expansion grain pieces to form a grain mixture such that the treated low expansion grains and the high expansion grains are distributed throughout the mixture in a relatively uniform manner. The grain mixture comprises about 1% to about 30% by weight puffable low expansion grain. The percentage of the puffable low expansion grain in the grain mixture will vary according to the flavoring agent and/or coloring agent profile of the absorption composition. A strong flavoring agent such as vanilla extract, for example, may require a smaller proportion of treated low expansion grain to deliver the flavor to the consumer in the final puffed grain food product. Preferably, the grain mixture comprises about 10% to about 25% by weight puffable low expansion grain.

The treated puffable low expansion grain and the puffable high expansion grain can be combined by any dry mixing technique and/or equipment known in the art. Examples of mixing equipment useful therefor include, but are not limited to, ribbon mixers, paddle mixers, cone mixers, funnel mixers and tumblers.

The mixture is then placed in a mold and puffed into an edible puffed grain food product by any process known, generally to form a unitary mass composed of low expansion puffed grain pieces and high expansion puffed grain pieces, for example, as illustrated in FIG. 1. FIG. 1 illustrates a grain cake 10 (not to scale) in cross-sectional view which has been formed as a unitary mass as described and is composed of puffed low expansion grain pieces 12 and puffed high expansion grain pieces 14. The flavor and/or color absorbed by pieces 12 form discrete flavor and/or color regions distributed throughout the bulk of grain cake 10. Typically, the mold is shaped to produce a round or rectangular grain cake or wafer. Alternatively, the mold can have other forms to produce a puffed grain food product in any desired shape and in multiple pieces. For example, the mold can be formed to provide a puffed grain food product in the shape of a fruit or other foodpiece. The mold may be designed to imprint a design upon the resultant puffed grain food product. Alternatively, the puffing can be controlled so that expansion (puffing) is constrained in the chamber in at least one dimension (e.g., width, length or height) while permitting full or substantially full unconstrained volumetric expansion in at least a second dimension. This can be accomplished in a puffing machine by placing an amount of food material in accordance with the invention to be puffed in the puffing chamber such that when puffed in the chamber, the expanded food material will not be constrained by the chamber volume (i.e., at no time will the total volumetric expansion of the puffed product be constrained by the inner surfaces of the puffing chamber, while dimensional expansion in one dimension (e.g., width and length, for example) or in two dimensions is constrained (e.g., width and length, for example). Sufficient material should be placed in the puffing chamber to form a single, unitary mass upon puffing.

Once puffed, the low expansion grains create dispersed flavor and/or color regions, e.g., particles, pockets or pieces throughout the puffed high expansion grains. These low expansion grains are generally distributed or dispersed throughout the entire unitary mass of the puffed grain food product, preferably relatively uniformly distributed. As flavoring agents, these regions create a puffed grain food product with a more uniform flavor profile. As coloring agents, these regions create a more aesthetically appealing product to consumers. It is to be understood that the exterior surfaces of the puffed grain food product of the present invention may be further treated with additional flavorant and/or colorant, as desired.

Puffing machines are well known to those skilled in the art and consequently are not described in detail herein. Suitable puffing machines are made by Real Foods Pty. Ltd. of St. Peters NSW, Australia.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A method of making a puffed grain food product comprising:

mixing puffable high expansion grain pieces with puffable low expansion grain pieces, said low expansion grain pieces having one or more ingredients absorbed therein selected from the group consisting of flavoring agents, coloring agents and mixtures thereof, to form a resulting grain mixture;

puffing said grain mixture in a mold to form a puffed grain food product.

2. The method of claim 1 wherein said low expansion grain pieces are formed by contacting untreated low expansion grain pieces with a liquid composition comprising coloring agents, flavoring agents and mixtures thereof.

3. The method according to claim 1 wherein the puffable low expansion grain pieces have an expansion ratio in the range of 1:1 to 1:7.

4. The method according to claim 1 wherein the puffable high expansion grain pieces have an expansion ratio in the range of 1:7 to 1:30.

5. The method of claim 1 wherein the puffable low expansion grain pieces are pre-processed by a procedure selected from the group consisting of extruding, popping, microwaving, roasting, steaming, baking, steeping, extracting, pelleting, freeze drying, drum drying, spray drying, micronizing and combinations thereof.

6. The method of claim 1 wherein the absorption capacity of said puffable low expansion grains is in the range of 50% to 150% by weight.

7. The method of claim 1 wherein the flavoring agent is selected from the group consisting of chocolate, butterscotch, peppermint, any flower flavor, any spice flavor, vanilla, any fruit flavor, caramel, nut flavors, beef, poultry, pork or seafood flavors; dairy flavors such as butter and cheese; any vegetable flavor and combinations thereof.

8. The method of claim 1 wherein the coloring agent is selected from the group consisting of FD&C Blue No.1, FD&C Blue No.2, FD&C Green No.3, FD&C Red No.3, FD&C Red No.40, FD&C Yellow No.5, FD&C Yellow No.6, Orange B, Citrus Red No.2, annatto extract, b-apo-8'-carotenal, beta-carotene, beet powder, canthaxanthin, caramel color, carrot oil, $\beta$-carotene, cochineal extract, cottonseed flour, ferrous gluconate, fruit juice, grape color extract, paprika, riboflavin, saffron, titanium dioxide, turmeric, vegetable juice and combinations thereof.

9. The method of claim 1 wherein the grain mixture comprises between 5% to 25% by weight puffable low expansion grain pieces.

10. The method of claim 1 wherein said puffed grain food product is in the shape of a cake.

11. A puffed grain food product prepared by the method comprising:

mixing puffable high expansion grain pieces with puffable low expansion grain pieces, said low expansion grain pieces having one or more ingredients absorbed therein selected from the group consisting of flavoring agents, coloring agents and mixtures thereof, to form a resulting grain mixture;

puffing said grain mixture in a mold to form a puffed grain food product.

12. The food product of claim 11 wherein said low expansion grain pieces are formed by contacting untreated low expansion grain pieces with a liquid composition comprising coloring agents, flavoring agents and mixtures thereof.

13. The food product of claim 11 wherein the puffable low expansion grain pieces have an expansion ratio in the range of 1:1 to 1:7.

14. The food product of claim 11 wherein the puffable high expansion grain pieces have an expansion ratio in the range of 1:7 to 1:30.

15. The food product of claim 11 wherein the puffable low expansion grain pieces are pre-processed by a procedure selected from the group consisting of instantizing, extruding, popping, microwaving, roasting, steaming, baking, steeping, extracting, pelleting, freeze drying, drum drying, spray drying, micronizing and combinations thereof.

16. The food product of claim 11 wherein the absorption capacity of said puffable low expansion grains is in the range of 50% to 200%.

17. The food product of claim 11 wherein the flavoring agent is selected from the group consisting of chocolate, butterscotch, peppermint, any flower flavor, any spice flavor, vanilla, any fruit flavor, caramel, nut flavors, beef, poultry, pork or seafood flavors; dairy flavors such as butter and cheese; any vegetable flavor and combinations thereof.

18. The food product of claim 11 wherein the coloring agent is selected from the group consisting of FD&C Blue No.1, FD&C Blue No.2, FD&C Green No.3, FD&C Red No.3, FD&C Red No.40, FD&C Yellow No.5, FD&C Yellow No.6, Orange B, Citrus Red No.2, annatto extract, b-apo-8'-carotenal, beta-carotene, beet powder, canthaxanthin, caramel color, carrot oil, cochineal extract, cottonseed flour, ferrous gluconate, fruit juice, grape color extract, paprika, riboflavin, saffron, titanium dioxide, turmeric, vegetable juice and combinations thereof.

19. The food product of claim 11 wherein the grain mixture comprises between 5% to 30% by weight puffable low expansion grain pieces.

20. The food product of claim 11 wherein said puffed grain food product is in the shape of a cake.

* * * * *